(12) United States Patent
Shinto

(10) Patent No.: US 8,902,443 B2
(45) Date of Patent: Dec. 2, 2014

(54) INFORMATION PROCESSING SYSTEM, INFORMATION PROCESSING APPARATUS, AND INFORMATION PROCESSING METHOD

(75) Inventor: Yasushi Shinto, Hino (JP)

(73) Assignee: Canon Kabushiki Kaisha, Tokyo (JP)

( * ) Notice: Subject to any disclaimer, the term of this patent is extended or adjusted under 35 U.S.C. 154(b) by 1000 days.

(21) Appl. No.: 12/634,522

(22) Filed: Dec. 9, 2009

(65) Prior Publication Data

US 2010/0149581 A1    Jun. 17, 2010

(30) Foreign Application Priority Data

Dec. 11, 2008 (JP) ................. 2008-316038

(51) Int. Cl.
| | |
|---|---|
| *G06K 15/00* | (2006.01) |
| *G06F 3/12* | (2006.01) |
| *H04N 1/00* | (2006.01) |
| *G06K 15/02* | (2006.01) |

(52) U.S. Cl.
CPC ........ *G06K 15/02* (2013.01); *H04N 2201/0036* (2013.01); *H04N 1/00888* (2013.01); *H04N 2201/0049* (2013.01); *H04N 1/00347* (2013.01); *G06F 3/1267* (2013.01); *G06F 3/1291* (2013.01); *H04N 2201/0039* (2013.01); *H04N 2201/0094* (2013.01); *G06K 15/1817* (2013.01); *G06F 3/1221* (2013.01); *H04N 2201/001* (2013.01); *H04N 1/00885* (2013.01); *H04N 1/00896* (2013.01)
USPC .......................... 358/1.14; 358/1.15; 358/1.16

(58) Field of Classification Search
None
See application file for complete search history.

(56) References Cited

U.S. PATENT DOCUMENTS

| | | | | |
|---|---|---|---|---|
| 7,437,022 B2 * | 10/2008 | Uchida et al. | ................. | 382/305 |
| 7,602,516 B2 * | 10/2009 | Ito | ................. | 358/1.15 |
| 7,609,417 B2 * | 10/2009 | Hashimoto | ................. | 358/400 |
| 7,610,411 B2 * | 10/2009 | Umekage et al. | ................. | 710/17 |
| 7,612,919 B2 * | 11/2009 | Takahashi | ................. | 358/400 |
| 7,693,298 B2 * | 4/2010 | Fukui et al. | ................. | 382/100 |
| 7,787,796 B2 * | 8/2010 | Nosaki | ................. | 399/88 |
| 7,812,978 B2 * | 10/2010 | Ando et al. | ................. | 358/1.13 |
| 7,818,652 B2 * | 10/2010 | Sakata | ................. | 714/774 |
| 7,979,726 B2 * | 7/2011 | Nakamura et al. | ................. | 713/323 |
| 2004/0054939 A1 * | 3/2004 | Guha et al. | ................. | 713/300 |
| 2004/0260967 A1 * | 12/2004 | Guha et al. | ................. | 714/3 |
| 2006/0010332 A1 * | 1/2006 | Nakamura et al. | ................. | 713/323 |
| 2006/0069870 A1 * | 3/2006 | Nicholson et al. | ................. | 711/118 |
| 2008/0260416 A1 * | 10/2008 | Nosaki | ................. | 399/88 |
| 2009/0210732 A1 * | 8/2009 | Aoyagi | ................. | 713/320 |

FOREIGN PATENT DOCUMENTS

| | | |
|---|---|---|
| JP | 2004-126959 A | 4/2004 |
| JP | 2006-53902 | 2/2006 |
| JP | 2008-167224 A | 7/2008 |
| JP | 2008-258895 A | 10/2008 |

* cited by examiner

*Primary Examiner* — Marcus T Riley
(74) *Attorney, Agent, or Firm* — Canon USA Inc. IP Division

(57) ABSTRACT

A first information processing apparatus receives file information from a second information processing apparatus when the second information processing apparatus is switched to a power saving state. When the first information processing apparatus receives a file information acquisition request, which is directed to the second information processing apparatus from another apparatus, the file information that has been received from the second information processing apparatus is sent to the other apparatus. The first information processing apparatus acquires by proxy a file that is to be stored in the second information processing apparatus and sends the file acquired by proxy to the second information processing apparatus when the second information processing apparatus is restored to the normal power state.

13 Claims, 23 Drawing Sheets

FIG. 7A

| FILE NAME | CREATOR | CREATED DATE AND TIME | FILE ID |
|---|---|---|---|
| 1a | X | 2008/01/01 01:01:01 | asf03abdso |
| 1b | Y | 2008/02/02 02:02:02 | gai88ag09ra |

FIG. 7B

| FILE NAME | CREATOR | CREATED DATE AND TIME | FILE ID |
|---|---|---|---|
| 2a | Z | 2008/03/03 03:03:03 | we92agsb9o |

FIG. 7C

| FILE NAME | CREATOR | CREATED DATE AND TIME | FILE ID |
|---|---|---|---|
| 3a | X | 2008/04/04 04:04:04 | xowyrav82a |
| 3b | Y | 2008/05/05 05:05:05 | qijnwg8vjsda |

FIG. 11

| ACCESS DESTINATION DESIGNATED BY USER | IP ADDRESS |
|---|---|
| MFP101 | IP ADDRESS OF MFP 101 |
| MFP102 | IP ADDRESS OF MFP 102 |
| MFP103 | IP ADDRESS OF MFP 103 |

FIG. 18

| ACCESS DESTINATION DESIGNATED BY USER | IP ADDRESS |
|---|---|
| MFP101 | IP ADDRESS OF MFP 103 |
| MFP102 | IP ADDRESS OF MFP 102 |
| MFP103 | IP ADDRESS OF MFP 103 |

FIG. 20

| FILE NAME | CREATOR | CREATED DATE AND TIME |
|---|---|---|
| 1c | Z | 2008/06/06 06:06:06 |

FIG. 21

| FILE NAME | CREATOR | CREATED DATE AND TIME | FILE ID |
|---|---|---|---|
| 1a | X | 2008/01/01 01:01:01 | asf13abdso |
| 1b | Y | 2008/02/02 02:02:02 | gai88ag09ra |
| 1c | Z | 2008/06/06 06:06:06 | weu0zxsdfkl |

# INFORMATION PROCESSING SYSTEM, INFORMATION PROCESSING APPARATUS, AND INFORMATION PROCESSING METHOD

BACKGROUND OF THE INVENTION

1. Field of the Invention

The present invention relates to an information processing system, an information processing apparatus, and an information processing method.

2. Description of the Related Art

An information processing apparatus including a storage unit for storing files and various kinds of information has been known. More specifically, a multifunction peripheral (MFP) including a print function, a copy function, and a communication function is known as an example of the information processing apparatus. The MFP including the communication function can receive a file from another information processing apparatus and transfer the file to another information processing apparatus.

Recently, power saving is required to the information processing apparatus. For example, power saving of the information processing apparatus can be achieved by cutting power supply to a storage unit, such as a hard disk for storing a file, when the information processing apparatus is brought into a power saving state In this case, however, if the file or the various kinds of information stored in the storage unit is requested to be read out from, for example, an external terminal, it is necessary to resume the power supply to the storage unit and restore the information processing apparatus into an information readable state, resulting in that a time period is required to restore the information processing apparatus.

Therefore, there is a problem that the information processing apparatus cannot make a quick response to an information acquisition request from the external terminal. Further, there is another problem that satisfactory power saving of the information processing apparatus cannot be achieved since the information processing apparatus is restored from the power saving state to a normal power state.

To solve the above problem, an information processing apparatus is discussed, which can make a quick response by using information preliminary copied and stored in another information processing apparatus while the information processing apparatus is kept in the power saving state, if the information acquisition request is received from the external terminal when the information processing apparatus is in the power saving state, for example, in Japanese Patent Application Laid-open No. 2006-53902.

According to the information processing apparatus discussed in Japanese Patent Application Laid-open No. 2006-53902, if the information acquisition request is received from the external terminal when the information processing apparatus is in the power saving state, the information processing apparatus can make a quick response while keeping the power saving state.

However, even with the information processing apparatus discussed in Japanese Patent Application Laid-open No. 2006-53902, when the information processing apparatus in the power saving state receives a file from another information processing apparatus, power supply to the storage unit needs to be resumed to restore the information processing apparatus into the information readable state in order to store the received file in the storage unit.

In the above case, the information processing apparatus is restored from the power saving state to the normal power state, so that there is a problem that satisfactory power saving of the information processing apparatus cannot be achieved. If the information processing apparatus keeps its power saving state in order to achieve the power saving, there occurs a problem that a file to be stored in the information processing apparatus may be lost.

SUMMARY OF THE INVENTION

According to an aspect of the present invention, an information processing system includes a first information processing apparatus and a second information processing apparatus that can communicate with the first information processing apparatus, wherein, when a state of the second information processing apparatus is switched to the power saving state, i.e., power supply to at least a storage unit of the second information processing apparatus is cutoff, a power saving state of the second information processing apparatus can be kept as well as the file to be stored in the second processing apparatus is prevented from being lost even when there is a file to be stored in the second information processing apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 7A, 7B and 7C, respectively, illustrate file information stored in a storage region A of a hard disk of the respective MFPs of the information processing system.

FIG. 11 illustrates an IP address management table.

FIG. 18 illustrates an Internet Protocol (IP) address management table managed by the MFP 102, which has received the power saving state-switch notification packet.

FIG. 20 illustrates file information of a file that is selected according to a file storage request by the user of the MFP 102 designating the MFP 101 as a storage destination of the file information.

FIG. 21 illustrates file information of the MFP 101 stored in a storage region A401 of a hard disk 211 of the MFP 103.

DESCRIPTION OF THE EMBODIMENTS

Various exemplary embodiments, features, and aspects of the invention will be described in detail below with reference to the drawings. However, components of the following exemplary embodiments are mere examples and thus the scope of the invention is not limited to those components.

Figure 1:
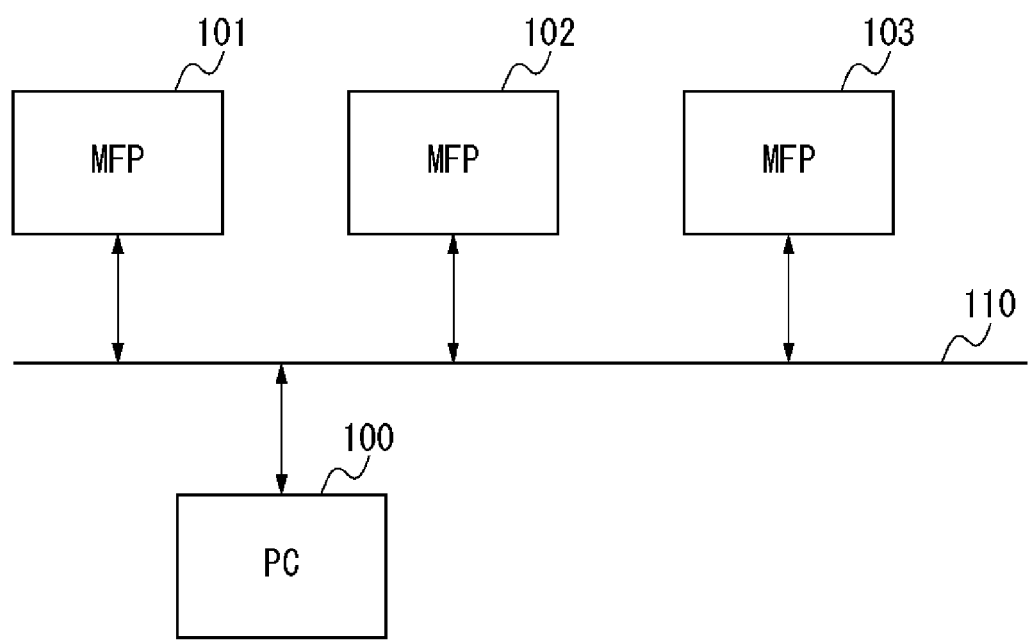
FIG. 1 is a block diagram illustrating a configuration of an information processing system according to a first exemplary embodiment.

FIG. 1 is a block diagram illustrating a configuration of an information processing system according to a first exemplary embodiment of the invention.

The information processing system includes a multifunction peripheral (MFP) 101, a MFP 102 and a MFP 103 as information processing apparatus and a personal computer (PC) 100 as an external terminal. Each apparatus in the information processing system is connected to each other through a local area network (LAN) and thus can communicate to each other.

The PC 100 has a function of a personal computer and an operating system (OS). An application program, which runs on the OS is installed in the PC 100. A printer driver is also installed in the PC 100, and thus a file generated by the application program can be converted into print data, which the MFPs 101 through 103 can print by the printer driver. The print data generated by the printer driver is sent to any one of the MFPs 101 through 103 that a user has selected.

Figure 2:
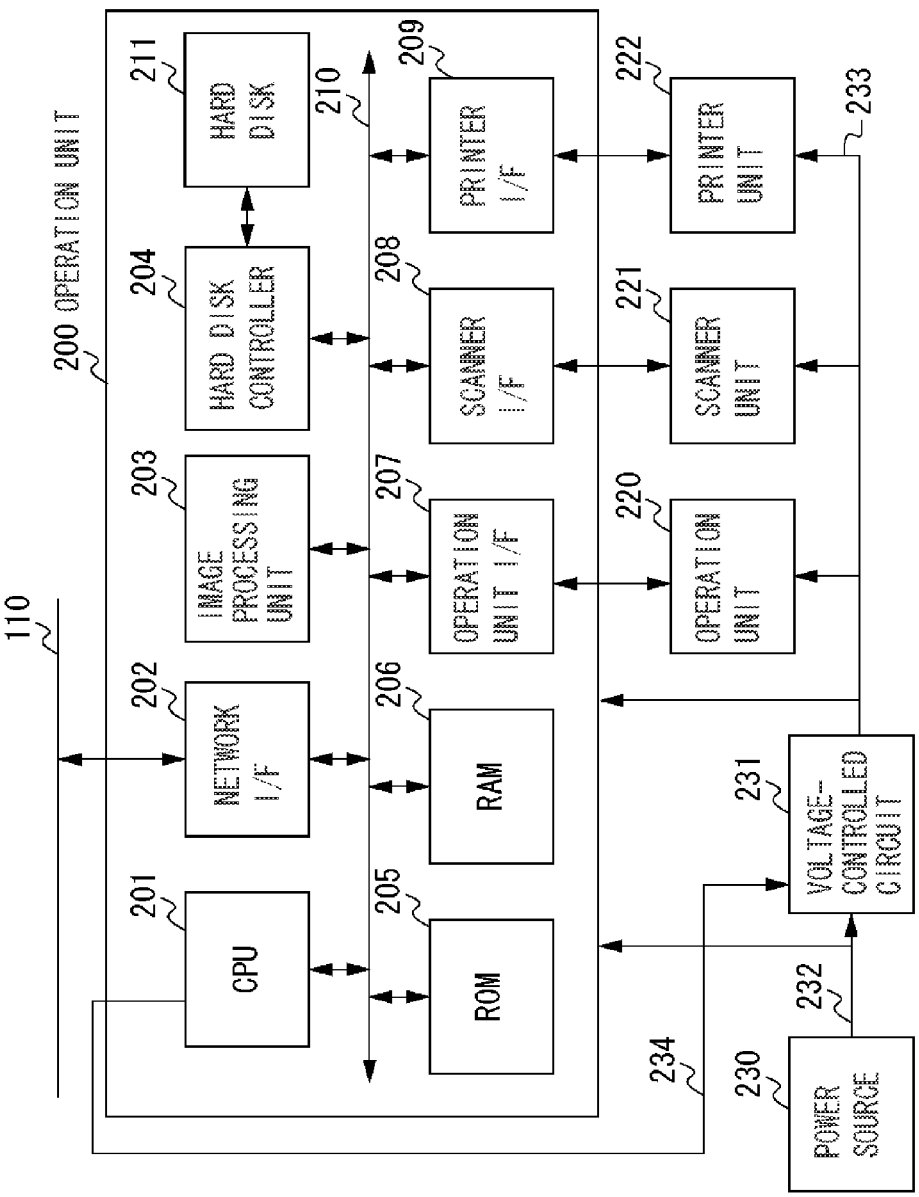
FIG. 2 is a block diagram illustrating a configuration of a multifunction peripheral (MFP) 101.

FIG. 2 is a block diagram illustrating a configuration of the MFP 101. The MFP 102 and the MFP 103 also have the same configurations as that of the MFP 101. The MFP 101 includes a controller unit 200 for controlling the MFP 101 in its entirety, a scanner unit 221 as an image input unit, a printer unit 222 as an image output unit, and an operation unit 220 as an operating unit.

In the scanner unit 221, an image on a document is irradiated by a light source such as a LED and reflected light of the irradiated light is captured by an imaging device, thereby obtaining image data. Further, the scanner unit 221 sends thus obtained image data to the controller unit 200, and the image data is stored in a random access memory (RAM) 206 or a hard disk 211.

The printer unit 222 receives the image data from the controller unit 200 and forms an image on a sheet based on the received image data. The image can be formed by any method such as an electrophotographic method or an inkjet method.

The controller unit 200 is electrically connected to the scanner unit 221 and the printer unit 222, respectively, through a scanner interface (I/F) 208 and a printer interface (I/F) 209. Further, the controller unit 200 can communicate with the PC 100, MFP 102, and the MFP 103 through a LAN 110. Still further, the controller unit 200 includes units described below.

A central processing unit (CPU) 201 executes a control program stored in a read onlymMemory (ROM) 205 by expanding the control program on the RAM 206 to control all of the units, which constitutes the controller unit 200, through a system bus 210.

The RAM 206 is used as a system work memory by the CPU 201 to expand and execute the control program on the RAM 206. Further, the RAM 206 is used to temporarily store image data obtained by the scanner unit 221, and store a file received through the LAN 110. The RAM 206 may be a static random access memory (SRAM) that can keep the stored content after power supply from a power source 230 is cutoff, or may be a dynamic random access memory (DRAM) in which the stored content is deleted after the power supply is cutoff. The ROM 205 stores a control program (boot program) executed by the CPU 201.

An operation unit interface (I/F) 207 is an interface unit for connecting the system bus 210 with the operation unit 220. The operation unit I/F 207 receives image data to be displayed on the operation unit 220, which also functions as a display unit, from the RAM 206 through the system bus 210. The operation unit I/F 207 outputs thus received image data to the operation unit 220. The operation unit I/F 207 outputs information input from the operation unit 220 to the CPU 201 through the system bus 210 in order to operate the MFP 101.

A network I/F 202 is connected to the LAN 110 and the system bus 210, and executes input processing for inputting information through the LAN 110 and output processing for outputting information through the LAN 110.

A hard disk controller 204 causes the hard disk 211 to store information (a file, image data, and the like) that is stored in the RAM 206, and outputs information stored in the hard disk 211 to the RAM 206, based on an instruction of the CPU 201.

The hard disk 211 is a nonvolatile storage unit that can store system software for controlling the MFP 101, image data obtained by the scanner unit 221, and information (a file and image data) input through the LAN 110.

An image processing unit 203 performs various kinds of image processing, such as correction, processing, and editing, for image data input from the scanner unit 221 through a scanner interface (I/F) 208. Further, the image processing unit 203 performs various kinds of image processing, such as correction, processing, and editing, for image data to be output to the printer unit 222 through a printer interface (I/F) 209.

A power source 230 can continuously output a voltage generated from a commercial power source while a main switch of the MFP 101 (not illustrated) is ON. The power source 230 applies a voltage to a voltage-controlled circuit 231 and the controller 200 through a main power line 232.

The voltage-controlled circuit 231 applies a voltage to each of the operation unit 220, the scanner unit 221, the printer unit 222, and the controller unit 200 through a sub-power line 233 when the MFP 101 is operated in a normal power state described below. On the other hand, the voltage-controlled circuit 231 cuts the voltage supply through the sub-power line 233 when the MFP 101 is operated in a power saving state described below. Whether the voltage-controlled circuit 231 supplies or cuts the voltage input from the power source 230 through the sub-power line is instructed by the CPU 201 through a control signal line 234 described below.

In FIG. 2, the controller unit 200 is connected to both of the main power line 232 and the sub-power line 233. The main power line 232 is connected to the CPU 201, the network I/F 202, and the RAM 206. The sub-power line 233 is connected to the image processing unit 203, the hard disk controller 204, the hard disk 211, the ROM 205, the operation I/F 207, the scanner I/F 208, and the printer I/F 209.

The control signal line 234 controls the power supply when the MFP 101 is switched to the power saving state or restored from the power saving state based on the control signal from the CPU 201.

A power status of the MFP 101 is described below. The MFP 101 is operated in the normal power state or the power saving state. In the normal power state, the voltage is supplied to the MFP 101 from the power source 230 through the main power line 232, and the voltage is also supplied to the sub-power line 233 through the voltage-controlled circuit 231. On the other hand, in the power saving state, the voltage is supplied to the MFP 101 from the power source 230 through the main power line 232, but the voltage is not supplied to the sub-power lien 233 through the voltage-controlled circuit 231.

In the normal power state, the MFP 101 executes a copying operation (duplicating operation) in which an image based on the image data input from the scanner unit 221 is formed on a sheet by the printer unit 222. Further, the MFP 101 executes a print operation in which an image based on the print data received from the PC 100 through the network I/F 202 is formed on a sheet by the printer unit 222.

Further, the MFP 101 executes sending processing in which various data, such as a file, stored in the hard disk 211 is sent to the PC 100 or other apparatuses through the network I/F 202. Still further, the MFP 101 executes reception processing in which various data, such as a file, sent from the PC 100 or other apparatuses through the network I/F 202 is stored in the hard disk 211.

However, the MFP 101 does not always execute the copying operation or the print operation. Therefore, the CPU 201 controls the voltage-controlled circuit 231 so as to cutoff the power supply to a specific portion of the MFP 101 when the MFP 101 is not operative (hereinafter referred to as the "non-operating state").

The CPU 201 determines that the MFP 101 is in the non-operating state when the MFP 101 comes to be under the following conditions. Then, the CPU 201 instructs the voltage-controlled circuit 231 to cutoff the power supply through the sub-power line 233.

(1) Image data is not input from the scanner unit 221 for a predetermined time period.

(2) Data is not received through the network I/F 202 for a predetermined time period.

(3) An operation is not input by a user through the operation unit 220 for a predetermined time period.

In addition to the above-described conditions (1) through (3), the determination by the CPU 201 that the MFP 101 becomes the non-operating state may be made by the user (operator) of the MFP 101 by pressing a power saving key (not illustrated) provided on the MFP 101.

Further, a timing at which the MFP 101 is switched to the power saving state may be set in advance by the user of the MFP 101 through the operation unit 220. In this case, the CPU 201 of the MFP 101 switches the MFP 101 to the power saving state from the normal power state when a time counted by a timer (not illustrated) becomes a predetermined time set by the user.

The network I/F 202 determines whether or not a start packet (a restoring order) for restoring the MFP 101 from the power saving state to the normal power state is received when the MFP 101 is operated in the power saving state. At the time, the network I/F 202 ignores a packet other than the start packet.

When the CPU 201 determines that the packet thus received is the start packet, the CPU 201 sends a switch signal for switching the power state to the normal power state, to the voltage-controlled circuit 231 through a control line 234. When the voltage control unit 231 receives the switch signal for switching the power state to the normal power state, from the CPU 201, the voltage control unit 231 controls a voltage to be supplied through the sub-power line 233.

Figure 3:
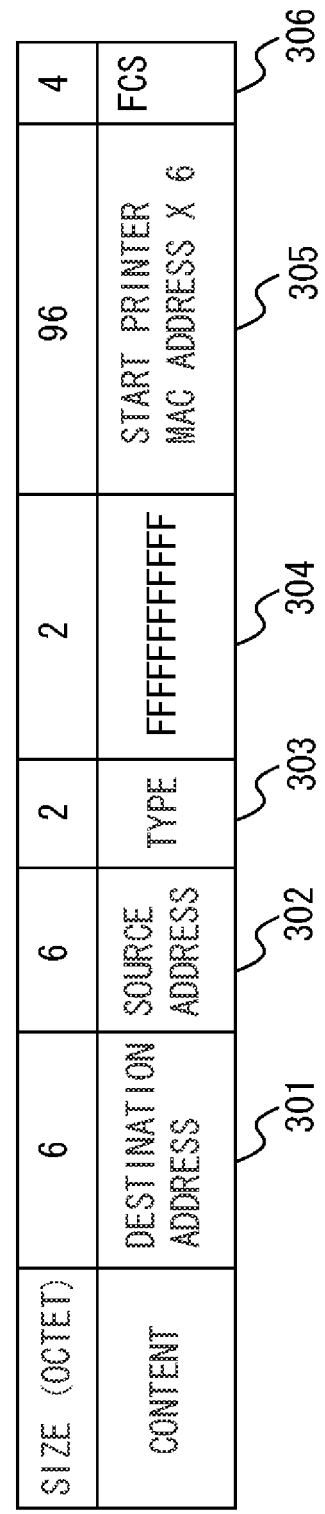
FIG. 3 illustrates an example of a start packet.

FIG. 3 illustrates an example of the above described start packet. In FIG. 3, the start packet includes a destination address field 301 indicative of a media access control (MAC) address of a destination, and a source address field 302 indicative of a MAC address of a source. The start packet further includes a type field 303 indicative of an upper protocol, and data fields 304 and 305 indicative of data unique to the start packet.

The data field 304 contains a synchronization stream "FFFFFFFFFFFF" and the data field 305 contains a 16 continuous set of values indicative of the MAC address of the MFP 101, which is the destination of the start packet. The start packet further includes a frame check sequence (FCS) field 306 indicative of a value of a cycle redundancy check (CRC). The format of the start packet is not limited to the format described above. For example, the start packet may be a packet having another format according to a prescription of its own.

Now, a file management method in the MFP 101 is described below. Descriptions of the file management method are omitted below with respect to the MFP 102 and the MFP 103 since the MFP 102 and the MFP 103 are managed in the similar manner to the MFP 101.

Figure 4:
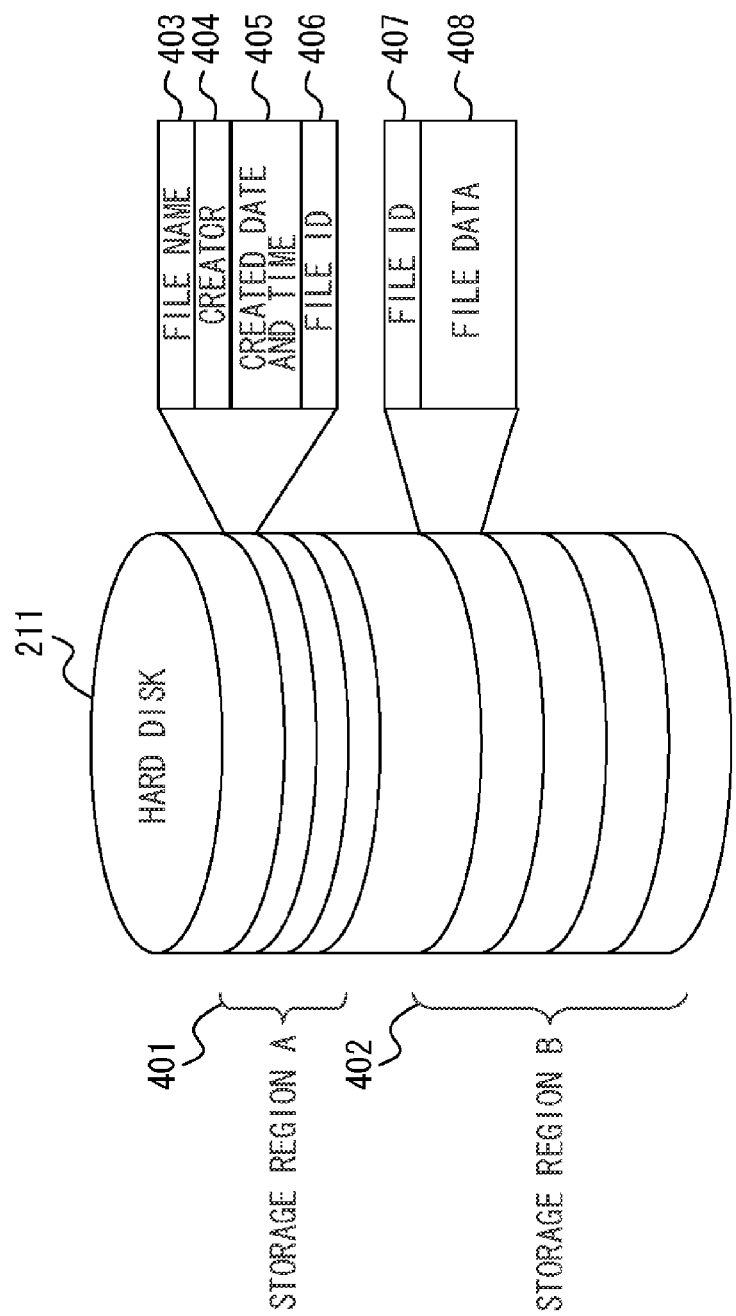
FIG. 4 illustrates a storage condition of a file in a hard disk 211 of the MFP 101.

FIG. 4 illustrates a storage condition of a file in the hard disk 211 of the MFP 101. Information (hereinafter referred to as the "file information") indicative of an attribute of the file such as a file name and a file creator is divided into a storage region A401 and a storage region B402 and managed in the respective storage region.

The storage region A401 stores file information of all the files stored in the hard disk 211. The storage region A401 includes a file name management region 403, a creator management region 404, a created date and time management region 405, and a file ID management region 406. In other words, the file information is not file data itself but is information indicative of an attribute of the file data.

The storage region B402 stores file data of all the files that are stored in the hard disk 211. The storage region B402 includes a file ID management region 407 and a file data management region 408.

In a first exemplary embodiment, a file ID is used in order to associate file information stored in the storage region A401 with file data stored in the storage region B402. For example, the hard disk controller 204 takes the following steps for acquiring a file with a specific file name.

A specific file name is initially searched from the file name management region 403 in the storage region A401, and a file ID in association with thus found file name is acquired from the file ID management region 406. Then, the hard disk controller 204 refers to the file ID management region 407 to acquire a file associated with thus acquired file ID from the file data management region 408.

Now, a file sharing service that the MFP 101, the MFP 102, and the MFP 103 provide to other apparatuses on the LAN 110 is described below. According to the file sharing service, a file (print data or image data) stored in the hard disk of each MFP can be acquired by the other MFPs or the PC 100. This service enables each MFP or the PC 100 to acquire files stored in the other MFPs.

In the following description, it is provided that the MFP 101 functions as a service providing apparatus for the file sharing service, i.e., functions as an apparatus that provides a file sharing service to the MFP 102. When the MFP 102 utilizes the file sharing service from the MFP 101, the MFP 102 sends a file information request packet to the MFP 101.

Figure 5:
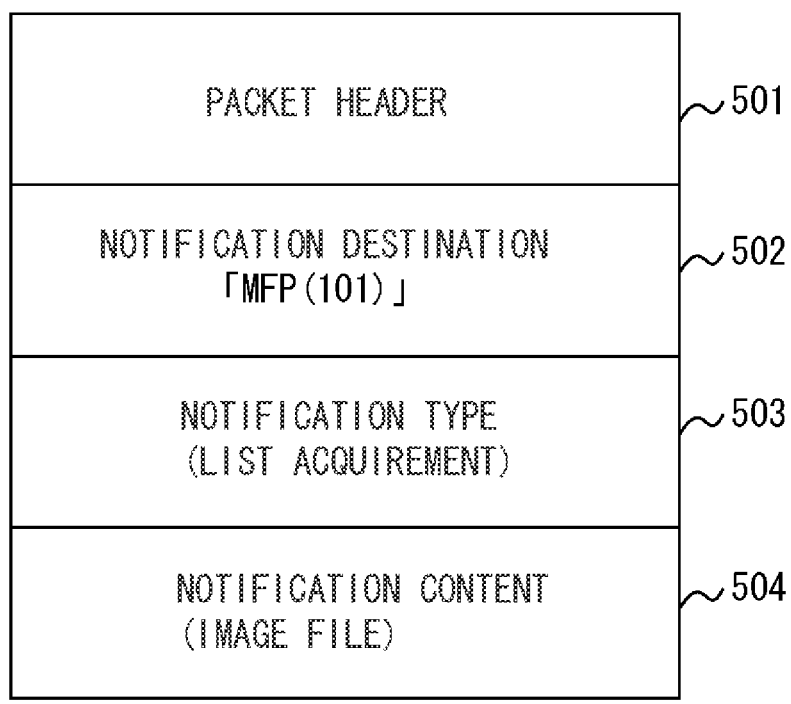
FIG. 5 illustrates an example of a file information request packet, which is sent from an MFP 102 to the MFP 101.

FIG. 5 illustrates an example of the file information request packet that the MFP 102 sends to the MFP 101. The file information request packet includes a packet header 501. The packet header 501 contains a source IP address, a destination IP address, a protocol ID, and the like if the network is constructed with a transmission control protocol (TCP)/internet protocol (IP).

The file information request packet also includes a notification destination storage section 502, a notification type storage section 503 and a notification content storage section 504. In the example of FIG. 5, the MFP 101, a file list, and a file, are respectively designated as a notification destination, a notification type, and a notification content.

FIG. 11 illustrates an IP address management table 1100 managed by the MFP 102. The IP address management table 1100 includes a field 1101 for storing an IP address of the MFP 101. The IP address management table 1100 also includes a field 1102 for storing an IP address of the MFP 102.

Further, the IP address management table 1100 includes a field 1103 for storing an IP address of the MFP 103. When the MFP 102 sends a file information request packet to the MFP 101 designated by the user, the MFP 102 generates a file information request packet in which the IP address of the MFP 101 designated in the IP address management table is set to the above-described notification destination storage section 502.

When the MFP 101 receives the file information request packet generated by the MFP 102, the CPU 201 of the MFP 101 instructs the hard disk controller 204 to acquire file information stored in the storage region A401. The hard disk controller 204 acquires file information from the storage region A401 of the hard disk 211 to store the file information in the RAM 206.

The CPU 201 instructs the network I/F 202 to send file information stored in the RAM 206 to the MFP 102 in response to a reception of the notification, received from the hard disk controller 204, that the file information is stored in the RAM 206. The network I/F 202 sends the file information stored in the RAM 206 to the MFP 102 in response to the instruction from the CPU 201.

As described above, the MFP 102 can acquire file information of all the files (file list) stored in the hard disk 221 of the MFP 101.

Figure 6:
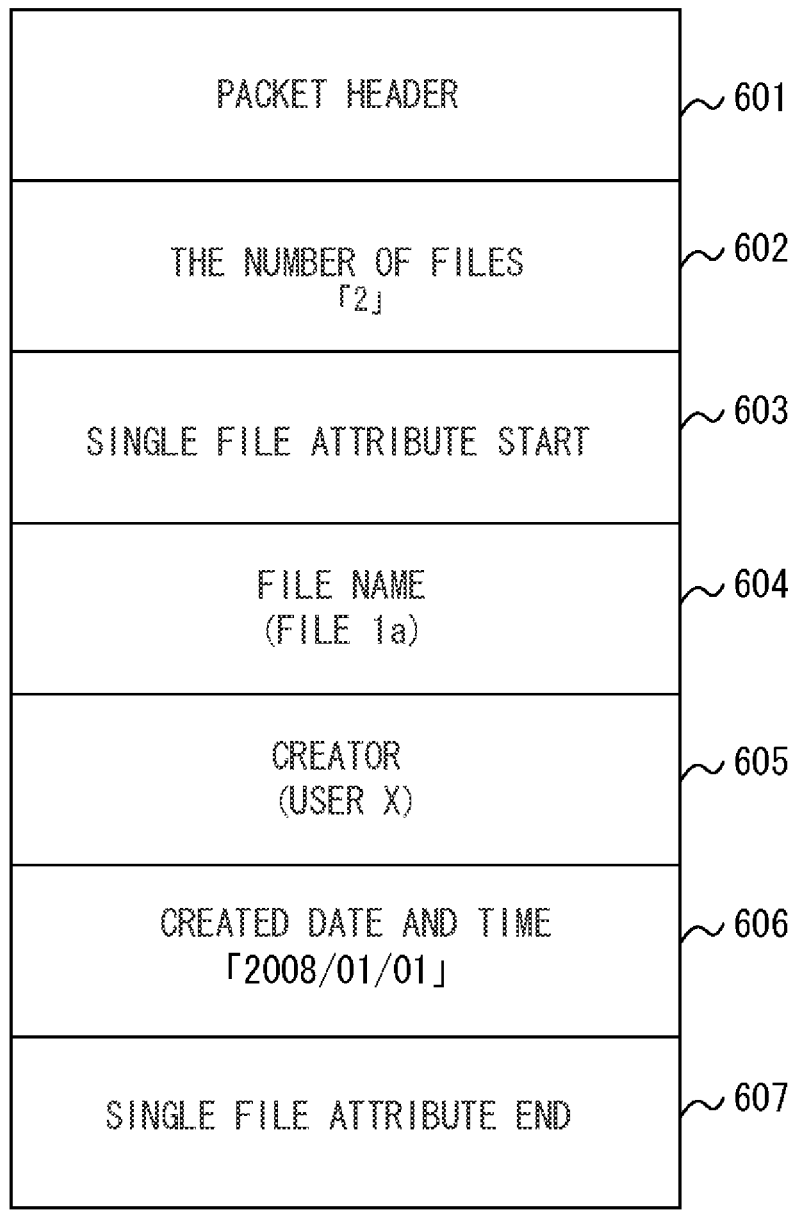
FIG. 6 illustrates an example of a response packet to be sent as a response to the file information acquisition request that the MFP 101 received from the MFP 102.

FIG. 6 illustrates an example of a response packet to be sent as a response to a file information acquisition request packet that the MFP 101 received from the MFP 102. The response packet includes a file number storage section 602, which stores the number of files to be responded in the form of a list after a packet header 601. Subsequently, a file name 604, a creator 605, a created date and time 606 as file information are stored for each file.

The file information is allocated between a single file attribute start section 603 and a single file attribute end section 607. In the example of FIG. 6, the response packet includes a file name storage section 604, a creator storage section 605, and a created date and time storage section 606. The response packet may include storage sections other than the above, as required, e.g., a storage section in which another attribute is stored.

The MFP 102 can acquire file information stored in the hard disk 211 of the MFP 101 by receiving the response packet illustrated in FIG. 6. The MFP 102 can cause the operation unit of the MFP 102 to display a list of files stored in the hard disk 211 of the MFP 101 based on the file information.

When a specific file is selected by a user from the list of files displayed on the operation unit, the MFP 102 generates a file data acquisition request packet (not illustrated) for acquiring the selected file from the MFP 101. The file data acquisition request packet is configured to contain information for specifying the file to be acquired, for example, a file name.

The MFP 101, after receiving the file data acquisition request packet from the MFP 102, refers to the storage region A401 of the hard disk 211 and acquires from the storage region B402 the file data designated by the file data acquisition request packet.

Then, the MFP 101 sends the file acquired from the hard disk 211 to the MFP 102 through the network I/F 202. Accordingly, the MFP 102 can acquire the file requested by the user from the MFP 101.

As described above, the file sharing service is provided by the MFP 101 to the MFP 102. The MFP 101 can be switched to the power saving state as described above.

However, a problem may occur if the MFP 101 receives the file information acquisition packet or the file data acquisition request packet when the MFP 101 is operated in the power saving state. The problem is that the power saving state of the MFP 101 cannot be maintained once the MFP 101 is restored to the normal power state in order to acquire the file information or the file data.

In the first exemplary embodiment, when the MFP 101 is operated in the power saving state, the MFP 103 responds by proxy to the file information acquisition request or the file data acquisition request by the MFP 102 to the MFP 101. Because the MFP 103 (first information processing apparatus) responds instead of the MFP 101 (second information processing apparatus), the MFP 101 can keep its power saving state.

FIGS. 7A, 7B and 7C, respectively, illustrate file information stored in the storage region A of the hard disk of each MFP (101, 102, and 103) of the information processing system. FIG. 7A illustrates file information stored in the MFP 101. FIG. 7B illustrates file information stored in the MFP 102. FIG. 7C illustrates file information stored in the MFP 103.

Now, processing executed by the MFP 101 when the MFP 101 is switched from the normal power state to the power saving state is described below.

Figure 8:
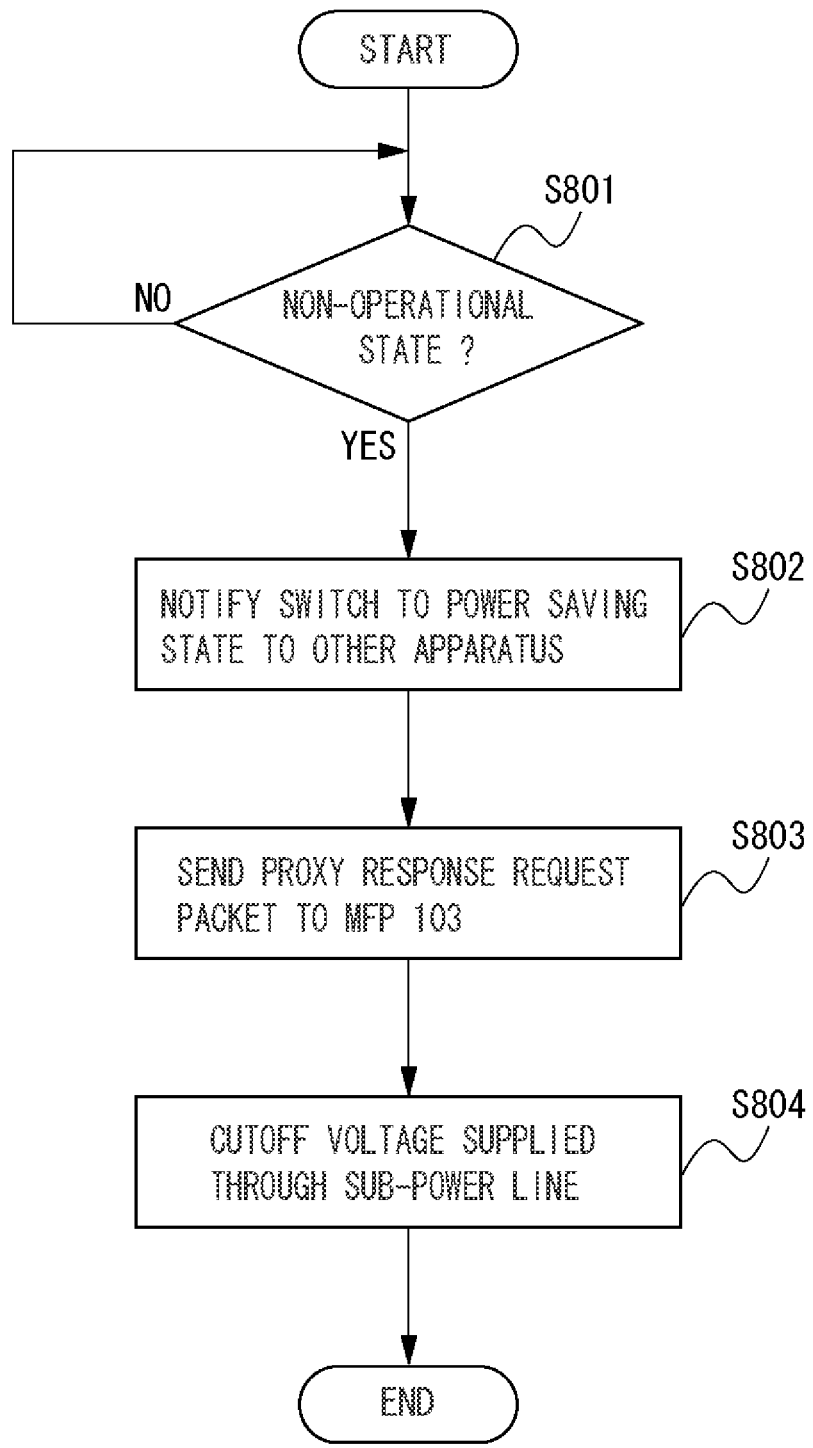
FIG. 8 is a flow chart illustrating processing executed when a state of the MFP 101 is switched from a normal power state to a power saving state.

FIG. 8 is a flow chart illustrating processing executed by the MFP 101 when the MFP 101 is switched from the normal power state to the power saving state. In the first exemplary embodiment, the file information request to the MFP 101 while the MFP 101 is operated in the power saving state is performed by proxy by the MFP 103.

Each of the steps in FIG. 8 is executed by the CPU 201 of the MFP 101 such that the CPU 201 reads out a control program stored in the hard disk 211 or the ROM 205 to execute each step.

In step S801, the CPU 201 determines whether or not the MFP 101 is switched to the non-operating state while the MFP 101 is operated in the normal power state. If the CPU 201 determines that the MFP 101 is switched to the non-operating state (YES in step S801), the processing proceeds to step S802. The CPU 201 determines that the MFP 101 is switched to the non-operating state when the above-described conditions (1) through (3) are satisfied.

In step S802, the CPU 201 instructs the network I/F 202 to notify all the apparatuses, which are connected to the LAN 110, that the MFP 101 is switched to the power saving state and that the MFP 103 takes the role of the MFP 101.

Figure 12:
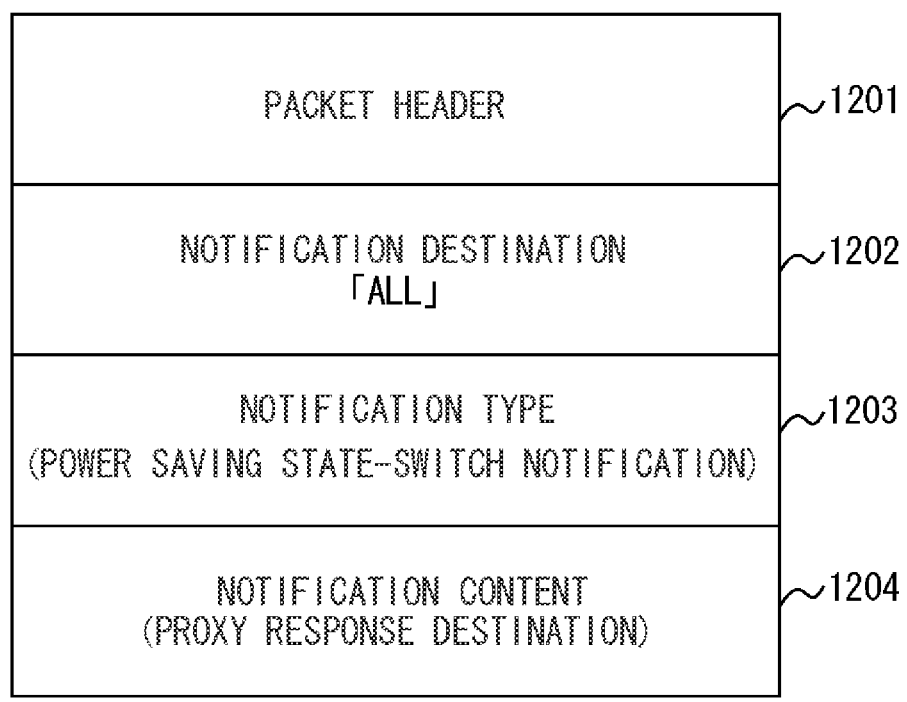
FIG. 12 illustrates a power saving state-switch notification packet that the MFP 101 sends to all apparatuses connected to a local area network (LAN) 110.

FIG. 12 illustrates a power saving state-switch notification packet that the MFP 101 sends to all the apparatuses connected to the LAN 110. In the power saving state-switch notification packet, data (ALL) indicative of all the apparatuses is added to a notification destination storage section 1202 after the packet header 1201, which is notified to all the apparatus on the LAN 110.

In a notification type storage section 1203, data indicative of switching to the power saving state is added. Data indicating that MFP 102 responds by proxy is added to a notification content storage section 1204.

In step S803, the CPU 201 generates a proxy response request packet containing a response content when the MFP 103 responds instead of the MFP 101, and instructs the network I/F 202 to send thus generated proxy response request packet to the MFP 103.

Figure 9:
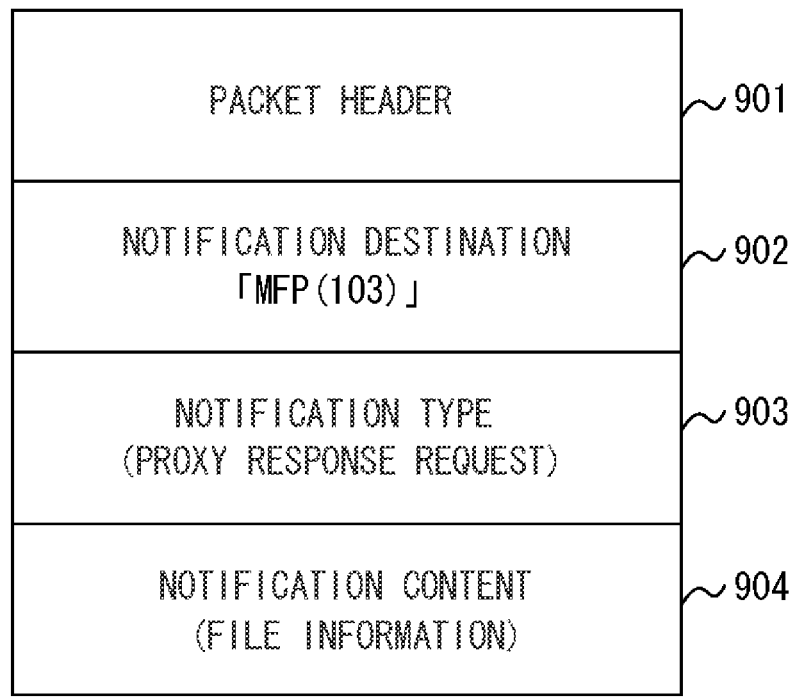
FIG. 9 illustrates a proxy response request packet that the MFP 101 sends to the MFP 103.

FIG. 9 illustrates a proxy response request packet that the MFP 101 sends to the MFP 103. In the proxy response request packet, a notification content indicative of the MFP 103 is added to the notification destination storage section 902. Further, a notification type indicative of the proxy response request is added to the notification type storage section 903. Still further, file information (see FIG. 7A) stored in the storage region A401 of the hard disk 211 of the MFP 101 is added to the notification content storage section 904.

The network I/F 202 of the MFP 101 functions as a third transmission unit for sending file information to the MFP 103. Further, the network I/F 202 of the MFP 103 functions as a first reception unit for receiving file information from the MFP 101.

In step S804, the CPU 201 sends a switch signal for switching the MFP 101 to the power saving state, through the control signal line 234 to the voltage-controlled circuit 231. The voltage-controlled circuit 231, after receiving the switch signal from the CPU 201, cuts the voltage application through the sub-power line 233. According to the above described processing, the state of the MFP 101 is finally switched from the normal power state to the power saving state.

Now, processing executed by the PC 100, the MFP 102 and the MFP 103, after receiving the power saving state-switch notification packet from the MFP 101, is described below with reference to a flow chart illustrated in FIG. 10.

Figure 10:
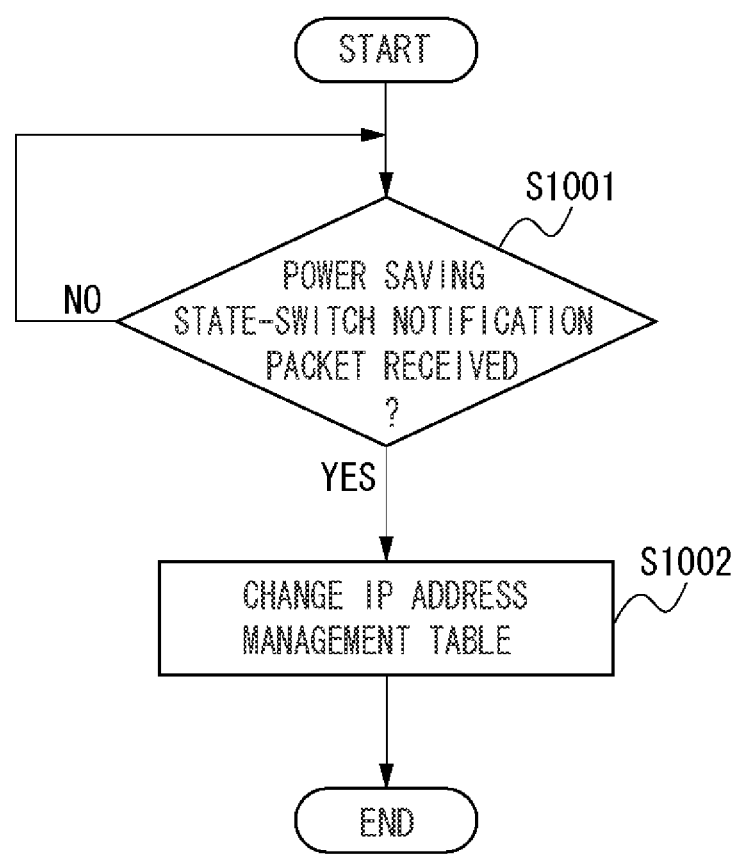
FIG. 10 is a flow chart illustrating processing executed by a personal computer (PC) 100, the MFP 102, and the MFP 103, which have received a power saving state-switch notification packet from the MFP 101.

In the present exemplary embodiment, the processing illustrated in FIG. 10 is described to be executed by the MFP 102, but the PC 100 and the MFP 103 also can execute similar processing. Each step in FIG. 10 is executed by the CPU 201 of the MFP 102 by reading out the control program stored in the hard disk 211 or the ROM 205.

In step S1001, the CPU 201 of the MFP 102 determines whether or not the power saving state-switch notification packet is received from other MFPs. If the CPU 201 of the MFP 102 determines that the power saving state-switch notification packet is received (YES in step S1001), the processing proceeds to step S1002. In step S1002, the CPU 201 changes the IP address of the MFP 101, which is a source apparatus of the received power saving state-switch notification packet, to the IP address of the MFP 103 by which proxy response is made instead of the MFP 101.

FIG. 18 illustrates an IP address management table that the MFP 102 manages that has received the power saving state-switch notification packet. The CPU 201 of the MFP 102 changes a sending destination IP address 1801 of the MFP 101 to the IP address of the MFP 103.

Figure 13:
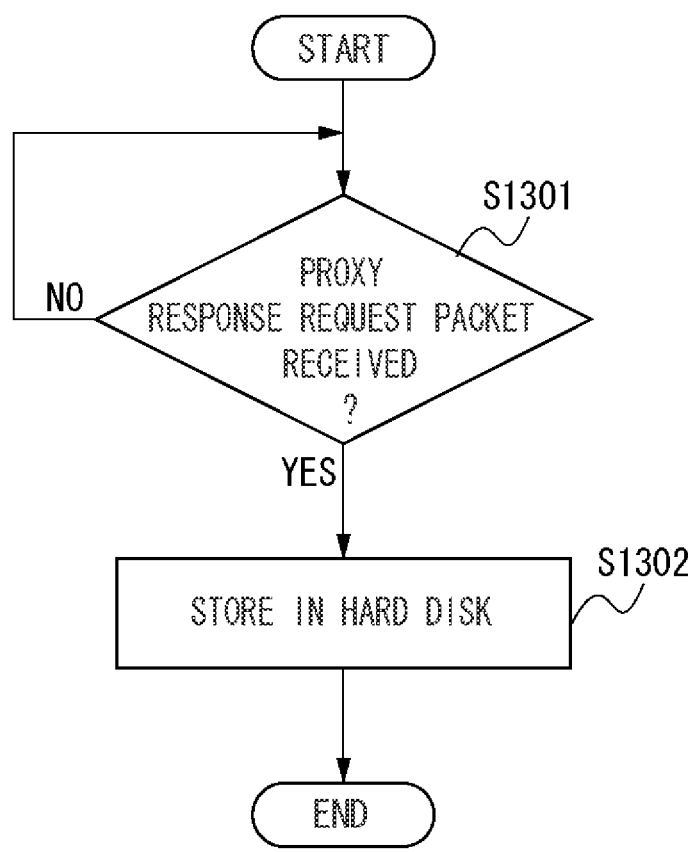
FIG. 13 is a flow chart illustrating processing executed by the MFP 103 when the MFP 103 receives a proxy response request packet from the MFP 101.

Now, processing executed by the MFP 103 that has received the proxy response request packet from the MFP 101 is described below with reference to a flow chart of FIG. 13. Each step illustrated in FIG. 13 is executed by the CPU 201 of the MFP 103 by reading out the control program stored in the hard disk 211 or the ROM 205 to the RAM 206.

In step S1301, the CPU 201 of the MFP 103 determines whether or not the proxy response request packet was received. If the CPU 201 of the MFP 103 determines that the proxy response request packet is received (YES in step S1301), the processing proceeds to step S1302. In step S1302, the CPU 201 stores file information of the MFP 101, which is stored in a notification content storage section 904 of the proxy response request packet, in the hard disk 211.

Figure 14:
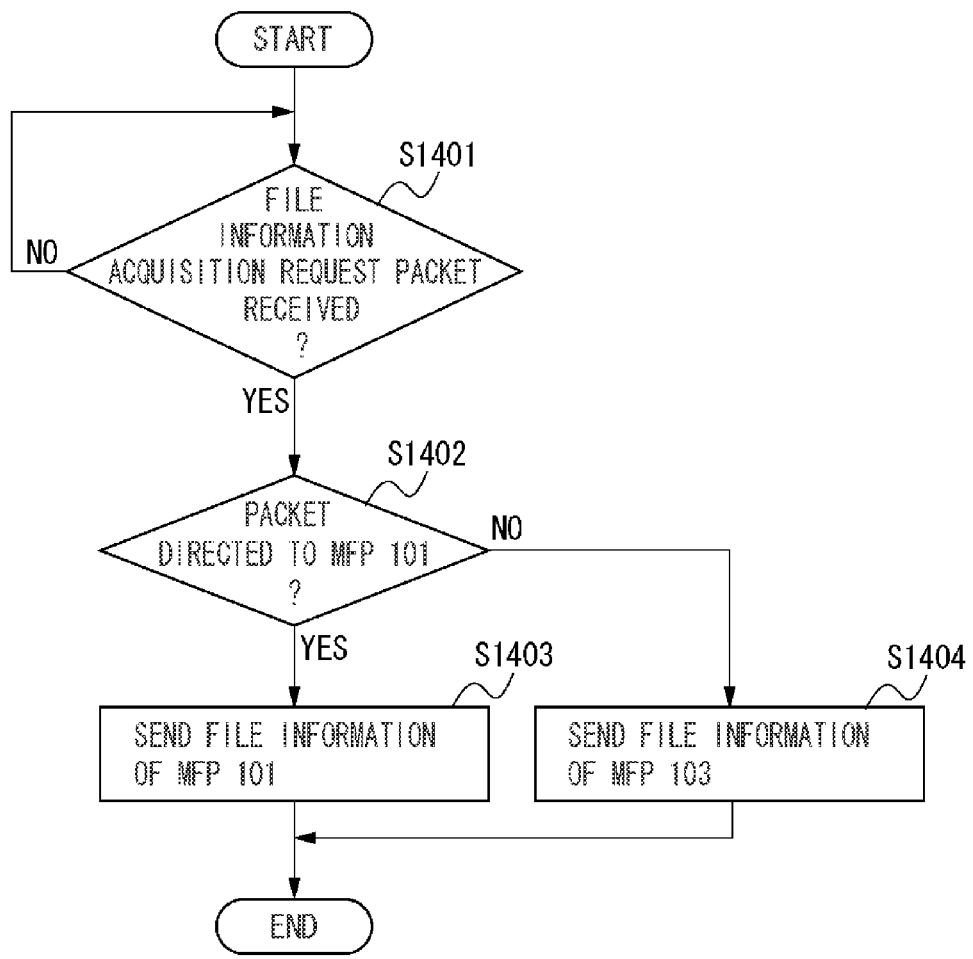
FIG. 14 is a flow chart illustrating processing executed by the MFP 103 when the MFP 103 receives the file information acquisition request packet from the MFP 102 while the MFP 103 is proxy responding instead of the MFP 101.

Now, processing executed by the MFP 103, which is responding by proxy for the MFP 101, when the MFP 103 receives a file information acquisition packet from the MFP 102, is described with reference to a flow chart illustrated in FIG. 14. Each step in FIG. 14 is executed by the CPU 201 of the MFP 103 by reading out the control program stored in the hard disk 211 or the ROM 205, to the RAM 206.

In step S1401, the CPU 201 of the MFP 103 determines whether or not the file information acquisition packet is received from the MFP 102. If the CPU 201 of the MFP 103 determines that the file information acquisition packet was received (YES in step S1401), the processing proceeds to step S1402. The network I/F 202 functions as a second receiving unit for receiving the file information acquisition request packet.

In step S1402, the CPU 201 determines whether or not thus received file information acquisition request packet is directed to the MFP 101, which is in a proxy responding state. If the file information acquisition request packet is directed to the MFP 101 (YES in step S1402), the processing proceeds to step S1403. If the file information acquisition request packet is directed to the MFP 103 (NO in step S1402), the processing proceeds to step S1404.

The CPU 201 makes determination based on data added to the notification destination storage section 502 in the network packet. In the first exemplary embodiment, the MFP 102 receives the power saving state-switch notification packet from the MFP 101.

Therefore, even when the file information acquisition request packet to which data indicative of MFP 101 is added is generated in the notification destination storage section 502, the packet is sent to the MFP 103. As a result, in the first exemplary embodiment, the file information request packet illustrated in FIG. 5 is sent to the MFP 103 from the MFP 102, and the CPU 201 of the MFP 103 determines as "YES" in step S1402.

In step S1403, the CPU 201 sends to the MFP 102 the file information of the MFP 101, which has been stored in the hard disk 211 in step S1302 in FIG. 13, since the received file information acquisition request packet is directed to the MFP 101. The network I/F 202 functions as a first sending unit for sending file information.

In step S1404, the CPU 201 sends the file information of the MFP 103, which is stored in the hard disk 211, to the MFP 102 since the received file information acquisition request packet is directed to the MFP 103.

Figure 15:
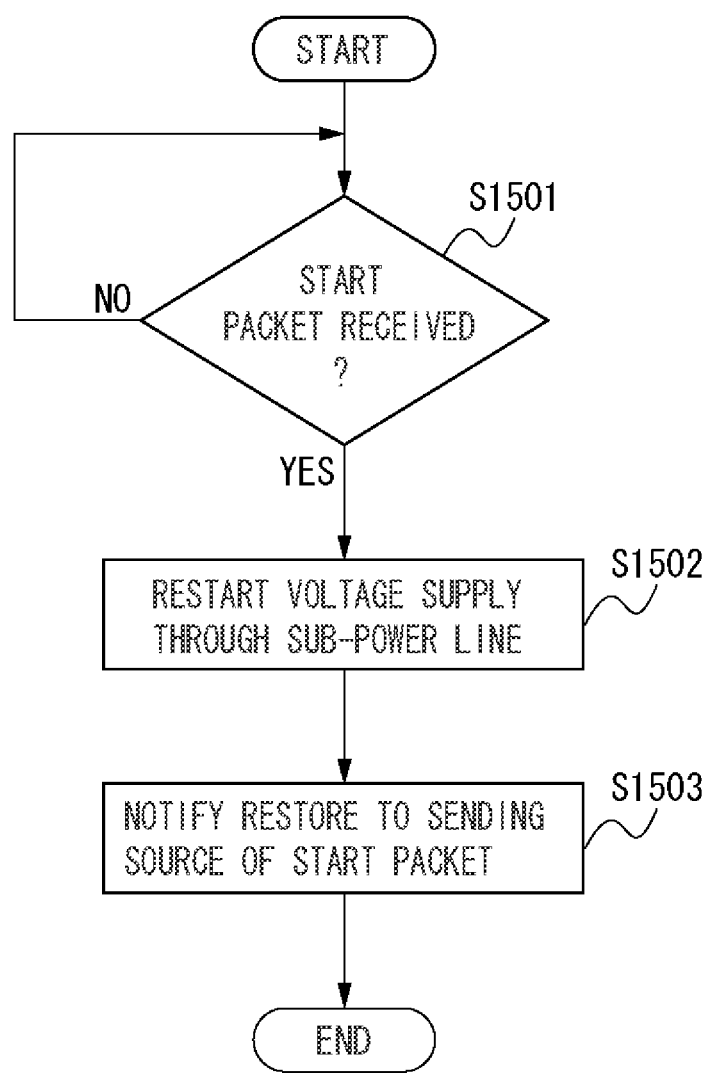
FIG. 15 is a flow chart illustrating processing in which the MFP 101 in the power saving state is restored to the normal power state.

Now, processing executed when the MFP 101 in the power saving state is restored to the normal power state is described below with reference to a flow chart of FIG. 15. Each step in FIG. 15 is executed by the CPU 201 of the MFP 101 by reading out the control program, which is stored in the hard disk 211 or the ROM 205, to the RAM 206.

In step S1501, the CPU 201 of the MFP 101 determines whether or not the network I/F 202 has received the start packet (see FIG. 3). If the CPU 201 of the MFP 101 determines that the network I/F 202 has received the start packet (YES in step S1501), the processing proceeds to step S1502.

The CPU 201 cancels the received packet and does not make a response to thus cancelled packet when the CPU 201 receives a packet, which is not the start packet. Therefore, the CPU 201 of the MFP 101 can keep its power saving state even when the network I/F 202 receives the file information acquisition request packet or the file data acquisition request packet.

The MFP 101 is restored to the normal power state only when the MFP 101 receives the start packet through the network I/F 202.

In step S1502, the CPU 201 sends a switch signal for restoring (switching) the state of the MFP 101 from the power saving state to the normal power state, to the voltage-controlled circuit 231 through the control signal line 234. The voltage-controlled circuit 231 resumes the voltage supply to each of the units, which are connected through the sub-power line 233, and restores the MFP 101 to the normal power state, when the voltage-controlled circuit 231 receives the switch signal from the CPU 201.

In step S1503, the CPU 201 refers to the source address field 302 of the start packet and instructs the network I/F 202 to notify to the source of the start packet that the MFP 101 is restored to the normal power state.

Figure 16:
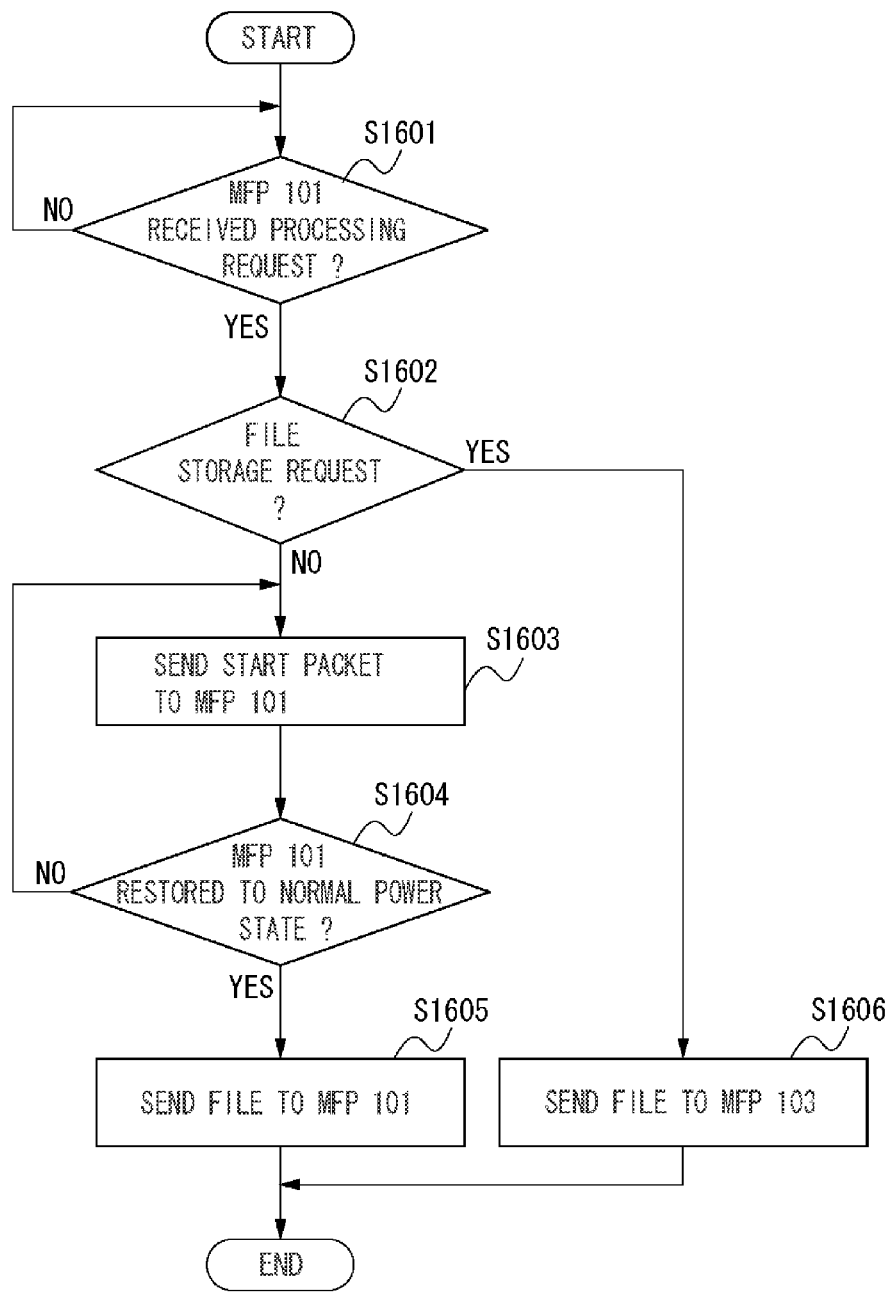
FIG. 16 is a flow chart illustrating processing executed by the MFP 102 when a user of the MFP 102 requests the MFP 101 in the power saving state to store a file.

Now, processing executed by the MFP 102 when the user of the MFP 102 requests the MFP 101 in the power saving state to store a file is described below with reference to a flow chart illustrated in FIG. 16. Each step of FIG. 16 is executed by the CPU 201 of the MFP 102 by reading out the control program, which is stored in the hard disk 211 or the ROM 205, to the RAM 206.

In step S1601, the CPU 201 of the MFP 102 determines whether or not there is a processing request from the user of the MFP 102 to the MFP 101 through the operation unit 220. When the CPU 201 determines that there is the processing request to the MFP 101 (YES in step S1601), the processing proceeds to step S1602.

In step S1602, the CPU 201 determines whether or not the processing content that the user of the MFP 102 designates is a file storage request. If the designated processing is the file storage request (YES in step S1602), the processing proceeds to step S1606.

The file storage request refers to a request for storing a file in the hard disk 211 of the MFP 101 and is different from the request for causing the MFP 101 to print the file. Further, the file storage request contains an instruction indicating that which one of the plurality of files stored in the hard disk 211 of the MFP 102 is requested to be stored by the file storage request (for example, file ID=we92agsb9o in FIG. 7).

In the case of a request to cause the MFP 101 to print the file, the determination in step S1602 is "NO" since the MFP 101 in the power saving state is required to be restored to the normal power state.

In step S1603, the CPU 201 instructs the network I/F 202 to send the start packet to the MFP 101 in order to restore the MFP 101 from the power saving state to the normal power state.

As described above, the MFP 102 receives the power saving state-switch notification packet from the MFP 101, so that the IP address management table is changed to the one as illustrated in FIG. 18. Therefore, the network I/F 202 sends the start packet to the MFP 103.

In step S1604, the CPU 201 monitors whether or not the network I/F 202 has received from the MFP 101 the notification that the state of the MFP 101 is restored to the normal power state, thereby determining whether or not the MFP 101 is restored to the normal power state.

If the network I/F 202 receives the notification that the MFP 101 is restored to the normal power state (YES in step S1604), the processing proceeds to step S1605. When the MFP 102 receives the notification from the MFP 101 that the MFP 101 is restored to the normal power state, the MFP 102 changes the IP address management table 1100 from the one illustrated in FIG. 18 to the one illustrated in FIG. 11.

In step S1605, the CPU 201 instructs the network I/F 202 to send the file indicated by the file print request (for example, file ID=we92agsb9o in FIG. 7) to the MFP 101, which is restored to the normal power state.

In step S1606, the CPU 201 instructs the network I/F 202 to send the file indicated by the file storage request (for example, file ID=we92agsb9o of FIG. 7) to the MFP 103. In step S1606, a reason why the CPU 201 instructs the network I/F 202 to send the file to the MFP 103 in response to the file storage request, which is directed to the MFP 101, is to keep the power saving state of the MFP 101.

Figure 19:
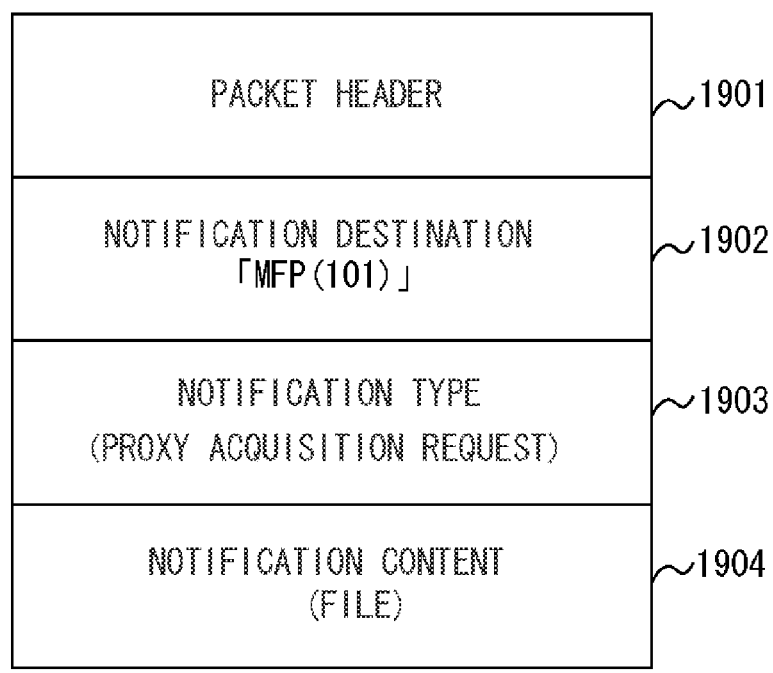
FIG. 19 is a flow chart illustrating processing executed by the MFP 103 when the MFP 103 received the proxy acquisition request packet from the MFP 102.

The MFP 102 can cause the MFP 101 not to restore from the power saving state by sending a file to the MFP 103, which takes the role of the MFP 101. The file is sent from the MFP 102 to the MFP 103 by sending a proxy acquisition request packet in FIG. 19. In the proxy acquisition request packet of FIG. 19, data indicative of the MFP 101 that the user designates as a storage destination is added to a notification destination storage section 1902.

Further, data indicative of the proxy acquisition request is added to a notification type storage section 1903, and data of a file that the user has designated (file data of file ID=we92agsb9o) is added to a notification content storage section 1904.

Figure 17:
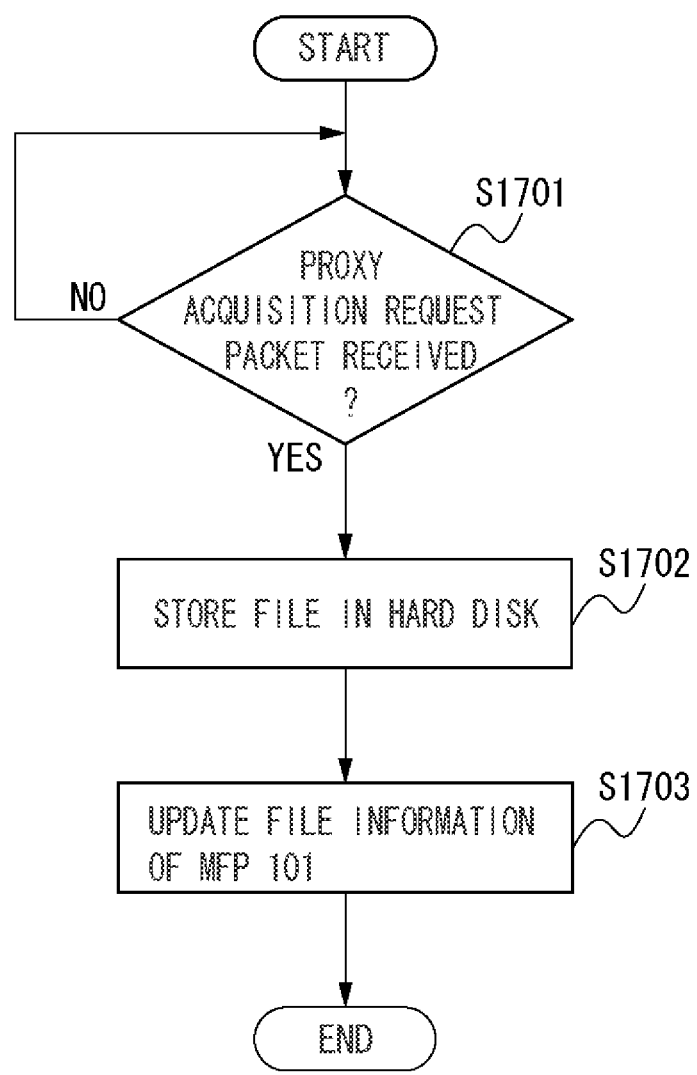
FIG. 17 is a flow chart illustrating processing executed by the MFP 103 when the MFP 103 received a proxy acquisition request packet from the MFP 102.

Now, processing executed by the MFP 103 when the MFP 103 receives the proxy acquisition request packet from the MFP 102 is described below with reference to a flow chart illustrated in FIG. 17. FIG. 20 illustrates file information of a file selected according to a file storage request when the user of the MFP 102 designates the MFP 101 as the storage destination.

In step S1701, the CPU 201 of the MFP 103 determines whether or not the proxy acquisition request packet is received from the MFP 102. If the CPU 201 of the MFP 103 determines that the proxy acquisition request packet is received from the MFP 102 (YES in step S1701), the processing proceeds to step S1702. The network I/F 202 of the MFP 103 functions as a third receiving unit for receiving a file to be stored in the MFP 101.

In step S1702, the CPU 201 stores the file data, which is added to the notification content storage section 1904 of the received proxy acquisition request packet, in the storage region B402 of the hard disk 211.

In step S1703, the CPU 201 adds file information as to the file data stored in step S1702 to the file information of the MFP 101 stored in the storage region A401 in the hard disk 211, thereby updating the file information.

According to the update processing in step S1703, the file information of the file received from the MFP 102 is reflected as the information to be stored in the MFP 101. Therefore, when the file information acquisition request packet as to the MFP 101 is received from the PC 100, the file information, of which file information as to the file that the MFP 102 acquired by proxy is updated, can be sent to the PC 100.

FIG. 21 illustrates file information of the MFP 101 to be stored in the storage region A401 of the hard disk 211 of the MFP 103. A file (file name 1c), which is requested by the proxy acquisition request from the MFP 102 is added to the file information.

Now, processing executed by the MFP 103 when the MFP 101 is restored from the power saving state to the normal power state is described below with reference to a flow chart illustrated in FIG. 22. In this case, it is assumed that the MFP 102 has sent to the MFP 103 the proxy acquisition request packet as to the file to be stored in the MFP 101 before the MFP 103 sends a start packet to the MFP 101.

In step S2201, the CPU 201 of the MFP 103 determines whether or not the network I/F 202 has received the start packet that is directed to the MFP 101. If the CPU 201 of the MFP 103 determines that the network I/F 202 has received the start packet (YES in step S2201), the processing proceeds to step S2202. The start packet directed to the MFP 101 is sent, for example, from the MFP 102 in step S1603 in FIG. 16.

In step S2202, the CPU 201 instructs the network I/F 202 to send the start packet illustrated in FIG. 3 to the MFP 101. The network I/F 202 of the MFP 103 functions as a fourth sending unit for sending a restoring order for restoring the MFP 101 to the normal power state.

In step S2203, the CPU 201 monitors whether or not the network I/F 202 has received from the MFP 101 a notification that the MFP 101 is restored to the normal power state, thereby determining whether or not the MFP 101 is restored to the normal power state. If the network I/F 202 has received the notification that the MFP 101 is restored to the normal power state (YES in step S2203), the processing proceeds to step S2204.

In step S2204, the CPU 201 determines whether or not the proxy acquisition request packet as to the MFP 101 has been received. If the proxy acquisition request packet as to the MFP 101 has been received (YES in step S2204), the processing proceeds to step S2205. If the proxy acquisition request packet as to the MFP 101 has not been received yet (NO in step S2204), the processing proceeds to step S2206.

In step S2205, the CPU 201 instructs the network I/F 202 to send to the MFP 101 the file data stored in the notification content storage section 1904 of the received proxy acquisition request packet, and file information relating to the above file data. The network I/F 202 of the MFP 103 functions as a second sending unit for sending the file acquired by proxy to the MFP 101.

Further, the network I/F 202 of the MFP 101 functions as a fourth receiving unit for receiving the file that the MFP 103 acquired by proxy. When the network I/F 202 receives the file data sent from the MFP 103 in step S2205, the CPU 201 of the MFP 101 controls so as to store the file data in the storage region B402 of the hard disk 211 of the MFP 101.

In step S2206, the CPU 201 sends a proxy response end notification packet, which indicates that the MFP 103 completes the processing of the proxy response for the MFP 101, to all the apparatuses that are connected to the LAN 110.

Figure 23:
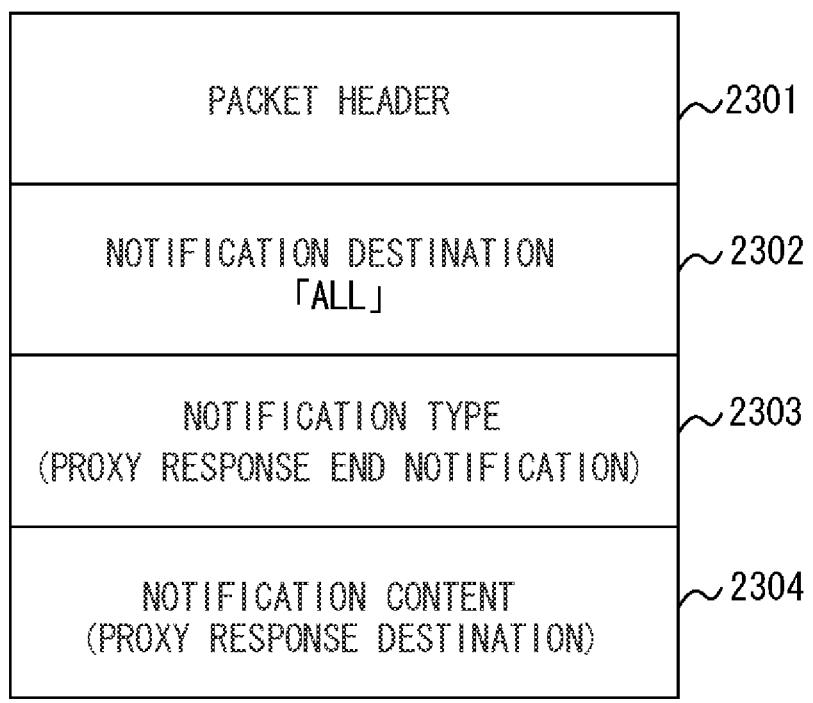
FIG. 23 illustrates an example of a proxy response end-notification packet.

FIG. 23 illustrates an example of the proxy response end notification packet. Data indicating that all the apparatus are designated as the notification destination is added to the notification destination storage section 2302 of the proxy response end notification packet. Data indicative of the proxy response end notification is added to the notification type storage section 2303, and data indicating that a request source of the proxy response was the MFP 101 is added to the notification content storage section 2304.

Each MFP and the PC 100, which have received the proxy response end notification packet, revise the IP address management table 1100 after receiving the power saving state-switch notification in FIG. 18. In other words, the IP address 1801 corresponding to the MFP 101 is revised from the IP address of the MFP 103 to the IP address 1101 of the MFP 101.

Figure 22:
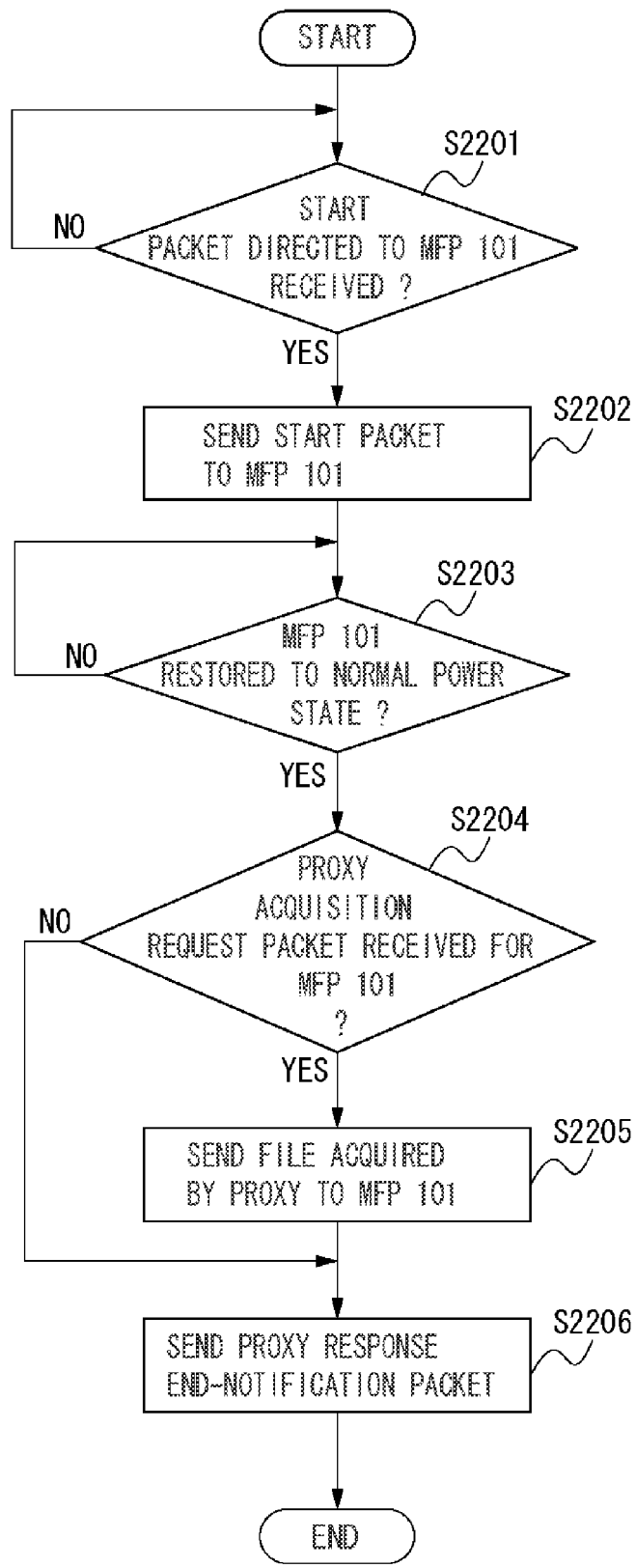
FIG. 22 is a flow chart illustrating processing executed by the MFP 102 when the MFP 102 restores the MFP 101 from the power saving state to the normal power state.

In the flow chart of FIG. 22, the MFP 101 is restored to the normal power state by sending the start packet from the MFP 103 to the MFP 101. In addition to this, the processing of steps S2204 through S52206 may be executed when the MFP 101 is restored to the normal power state by any factor.

For example, the MFP 101 may be configured to notify to the MFP 103 that the power saving state is cancelled when a power saving state cancel key (not shown) provided on the MFP 101 is pressed. The MFP 103 may be configured to execute the processing of steps S2204 through S2206 when the MFP 103 determines that the MFP 101 is restored to the normal power state in step S203.

As described above, according to the first exemplary embodiment, the power saving state of the MFP 101 can be kept even when the file storage request to the MFP 101 is made by other apparatus, when the MFP 101 is switched to the power saving state in which the power supply to the hard disk 211 is cutoff.

Further, when the file storage request to the MFP 101 is made by other apparatus, the MFP 103 can acquire by proxy the file, which is requested to be stored in the MFP 101. The file acquired by the MFP 103 by proxy can be sent to the MFP 101 after the MFP 101 is restored from the power saving state to the normal power state.

Accordingly, the file requested to be stored in the MFP 101 is prevented from being lost even when the file storage request is made to the MFP 101 while the MFP 101 is operated in the power saving state.

A second exemplary embodiment is an example modification of the first exemplary embodiment. Therefore, portions other than the portions as specifically described below have the same configurations as the first exemplary embodiment. In the first exemplary embodiment, the MFP 103 sends the file, which the MFP 103 acquired by proxy, to the MFP 101 when the MFP 101 is restored from the power saving state to the normal power state if the proxy acquisition request packet for the MFP 101 has been received (YES in step S2204).

On the other hand, in the second exemplary embodiment, the MFP 103 does not send the file, which the MFP 103 has acquired by proxy, to the MFP 101 when the MFP 101 is restored from the power saving state to the normal power state even if the proxy acquisition request packet for the MFP 101 has already been received. Instead, in the second exemplary embodiment, the MFP 103 sends to the MFP 101 only file information indicative of an attribute of the file acquired by the MFP 103 by proxy, when the MFP 101 is restored from the power saving state to the normal power state.

In the second exemplary embodiment, the file that the MFP 103 acquired by proxy is sent to the MFP 101 if the MFP 102 or the PC 100 issues a processing request (for example, a file acquisition request) for the file that the MFP 103 has acquired by proxy.

However, the proxy response of the MFP 103 for the MFP 101 ends in step S2206 of FIG. 22, so that the file acquisition request, which is directed to the MFP 101, is sent to the MFP 101 after the proxy response ends.

Therefore, in the second exemplary embodiment, if the file processing request is made for the file that the MFP 103 acquired by proxy of the MFP 101, the MFP 101 requests the MFP 103 to send the file, which the MFP 103 has acquired by proxy, to the MFP 101 based on the file information that was preliminary acquired from the MFP 103. The MFP 103, then, sends to the MFP 101 the file data that the MFP 103 preliminary acquired by proxy when the MFP 103 receives the file sending request from the MFP 101.

The MFP 101 responds to the file processing request from the MFP 102 or the PC 100 after the MFP 101 receives from the MFP 103 the file, which the MFP 103 has acquired by proxy.

As described above, according to the second exemplary embodiment, even when the MFP 101 is restored from the power saving state to the normal power state, the MFP 103, which has acquired the file to be stored in the MFP 101, does not send the file that the MPF 103 acquired by proxy, until the file processing request is made by other apparatus for the file that the MFP 103 has already acquired by proxy. Consequently, a processing load exerted to the MFP 101 and the MFP 103 can be reduced when the MFP 101 is restored from the power saving state to the normal power state.

A third exemplary embodiment is an example modification of the first exemplary embodiment and the second exemplary embodiment. Portions other than the portions as specifically described below have the same configurations as those of the first exemplary embodiment.

In the second exemplary embodiment, the file that the MFP 103 has acquired instead of the MFP 101 is the one to be sent when the MFP 102 or the PC 100 issues the processing request (for example, a file acquisition request) of the file that the MFP 103 acquired by proxy. However, in the second exemplary embodiment, if the MFP 101 attempts to acquire the file that the MFP 103 has acquired by proxy after the MFP 103 is switched to the power saving state, sufficient power saving cannot be achieved since the MFP 103 is restored from the power saving state to the normal power state.

To solve the above problem, in a third exemplary embodiment, the MFP 103 sends the file, which the MFP 103 has acquired by proxy since the file is regarded as the one to be stored in the MFP 101, to the MFP 101 when the MFP 103 is switched from the normal power state to the power saving state.

Therefore, according to the third exemplary embodiment, the MFP 103, which has acquired the file to be stored in the MFP 101 instead of the MFP 101, does not send the file acquired by proxy before the MFP 103 is switched to the power saving state, even if the MFP 101 is restored from the power saving state to the normal power state.

As a result, a processing load exerted to the MFP 101 and the MFP 103 when the MFP 101 is restored from the power saving state to the normal power state can be reduced. Further, power consumption, caused by the MFP 103 being unnecessarily restored to the normal power state after the MFP 103 is switched to the power saving state, can be reduced.

In the first exemplary embodiment, the MFP 103 works instead of the MFP 101 when the MFP 101 is switched to the power saving state, but another configuration may also be employed. For example, it may be so configured that the MFP 103 executes processing, which is to be executed by the MFP 101 in the first exemplary embodiment, and the MFP 101 executes the processing, which is to be executed by the MFP 103 in the first exemplary embodiment.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-316038 filed Dec. 11, 2008, which is hereby incorporated by reference herein in its entirety.

What is claimed is:

1. An information processing system including a first information processing apparatus and a second information processing apparatus capable of communicating with the first information processing apparatus,
the first information processing apparatus comprising:
a receiving unit configured to receive, from an external device via a network, a request for storing a new file into the second information processing apparatus when the second information processing apparatus is in a power saving state;
a first storage unit configured to store the file of the request received by the receiving unit, without returning the second information processing apparatus from the power saving state;
a transmitting unit configured to transmit a response for the request to the external device; and
a transferring unit configured to transfer the file stored in the first storage unit to the second information processing apparatus when the second information processing apparatus is returned from the power saving state after the transmitting unit transmits the response,
the second information processing apparatus comprising:
a second storage unit; and
a control unit configured to control such that the file transferred from the first information processing apparatus is stored in the second storage unit,
wherein the power saving state is a state in which power is not supplied to at least the second storage unit.

2. An information processing apparatus comprising:
a receiving unit configured to receive, from an external device, a request for storing a new file into another information processing apparatus when the other information processing apparatus is in a power saving state, wherein the power saving state is a state in which power is not supplied to at least a second storage unit included in a second information processing apparatus;

a first storage unit configured to store the file of the request received by the receiving unit, without returning the other information processing apparatus from the power saving state;

a transmitting unit configured to transmit a response for the request to the external device; and a transferring unit configured to transfer the file stored in the first storage unit to the second storage unit of the second information processing apparatus when the second information processing apparatus is returned from the power saving state after the transmitting unit transmits the response.

3. An information processing method for an information processing system including a first information processing apparatus and a second information processing apparatus capable of communicating with the first information processing apparatus, the method comprising:

causing the first information processing apparatus to receive, from an external device via a network, a request for storing a new file into the second information processing apparatus when the second information processing apparatus is in a power saving state;

causing the first information processing apparatus to store the file of the received request in a first storage unit, without returning the second information processing apparatus from the power saving state;

causing the first information processing apparatus to transmit a response for the received request to the external device;

causing the first information processing apparatus to transfer the stored file from the first storage unit of the first information processing apparatus to a second storage unit of the second information processing apparatus when the second information processing apparatus is returned from the power saving state after the response is transmitted; and controlling the second information processing apparatus to store in the second storage unit, the file transferred from the first information processing apparatus, wherein the power saving state is a state in which power is not supplied to at least the second storage unit.

4. The information processing system according to claim 1, wherein the power saving state is a state in which power supply at least to a storage device of the second information processing apparatus is cut off.

5. The information processing system according to claim 1, further comprising a file information receiving unit configured to receive file information indicative of a file attribute that is stored in the second information processing apparatus, from the second information processing apparatus.

6. The information processing system according to claim 5, wherein the file information receiving unit received the file information when the second information processing apparatus is switched to the power saving state.

7. The information processing system according to claim 5, wherein the file information includes at least information indicative any one of a file name of the file, a creator of the file, and a created date and time of the file.

8. The information processing system according to claim 5, further comprising an update unit configured to update the file information, based on the request received by the receiving unit.

9. The information processing apparatus according to claim 2, wherein the power saving state is a state in which power supply at least to a storage device of the second information processing apparatus is cut off.

10. The information processing apparatus according to claim 2, further comprising a file information receiving unit configured to receive file information indicative of a file attribute that is stored in the second information processing apparatus, from the second information processing apparatus.

11. The information processing apparatus according to claim 10, wherein the file information receiving unit received the file information when the second information processing apparatus is switched to the power saving state.

12. The information processing apparatus according to claim 10, wherein the file information includes at least information indicative any one of a file name of the file, a creator of the file, and a created date and time of the file.

13. The information processing apparatus according to claim 10 further comprising an update unit configured to update the file information, based on the request received by the receiving unit.

* * * * *